(12) United States Patent
Kao et al.

(10) Patent No.: US 7,746,818 B2
(45) Date of Patent: Jun. 29, 2010

(54) METHOD AND DEVICE FOR RECEIVING A PACKET

(75) Inventors: Kai Pon Kao, Taipei (TW); Chih Chia Wang, Taipei (TW)

(73) Assignee: VIA Technologies, Inc., Taipei (TW)

( * ) Notice: Subject to any disclaimer, the term of this patent is extended or adjusted under 35 U.S.C. 154(b) by 1116 days.

(21) Appl. No.: 10/995,235

(22) Filed: Nov. 24, 2004

(65) Prior Publication Data

US 2006/0109809 A1    May 25, 2006

(51) Int. Cl.
     *H04W 4/00*     (2009.01)
(52) U.S. Cl. .................. 370/328; 370/204; 455/142; 455/178.1; 455/187.1; 455/191.1; 455/464; 455/516
(58) Field of Classification Search .............. 370/338
See application file for complete search history.

(56) References Cited

U.S. PATENT DOCUMENTS

| | | | | |
|---|---|---|---|---|
| 6,037,835 A | * | 3/2000 | Smith et al. ............... | 329/316 |
| 6,633,753 B1 | * | 10/2003 | Kido ......................... | 455/343.2 |
| 6,748,200 B1 | * | 6/2004 | Webster et al. ............ | 455/234.1 |
| 7,103,321 B2 | * | 9/2006 | Xiong ........................ | 455/78 |
| 7,138,944 B2 | * | 11/2006 | Lawrence et al. ......... | 342/357.12 |
| 7,181,170 B2 | * | 2/2007 | Love et al. ................ | 455/67.13 |
| 7,340,015 B1 | * | 3/2008 | Jones et al. ................ | 375/347 |
| 2006/0193277 A1 | * | 8/2006 | Keaney et al. ............. | 370/310 |

* cited by examiner

*Primary Examiner*—Vincent P Harper
*Assistant Examiner*—Mazda Sabouri
(74) *Attorney, Agent, or Firm*—Thomas, Kayden, Horstemeyer & Risley (57) ABSTRACT

The present invention provides a single circuit and a method which can identify the WLAN standard of a packet or the modulation type of a packet. The single circuit includes a shift register, N determinators and decision logic. The shift register is configured to receive several periods of the preamble of the packet. Each of the N determinators is configured to determine whether the WLAN standard, or the modulation type, of the packet matches one of the N WLAN standards, or the N modulation types. Decision logic is configured to decide the WLAN standard, or the modulation type, of the packet.

24 Claims, 6 Drawing Sheets

METHOD AND DEVICE FOR RECEIVING A PACKET

FIELD OF INVENTION

The present invention relates to wireless communications, and more particularly, to a method and a device for receiving a packet.

BACKGROUND OF THE INVENTION

The U.S. Institute of Electrical and Electronics Engineers, Inc. (IEEE) 802.11 standard is a family of standards for wireless local area network (WLAN) in 2.4 and 5 GHz bands. The 802.11b standard defines various data rates in the 2.4 GHz band, including data rates of 1, 2, 5.5 and 11 Mbps. The 802.11b standard uses a direct sequence spread spectrum (DSSS) preamble having a period of 1 μs, and modulates data by a clock rate of 11 MHz. In addition to data rates of 802.11b, the 802.11g standard further defines higher data rates of 6, 9, 12, 18, 24, 36, 48 and 54 Mbps in 2.4 GHz band, and uses an orthogonal frequency division multiplexing (OFDM). The preamble includes 10 short periods, each having a period of 0.8 μs, and 2 long periods, and modulates data by a clock rate of 20 MHz. Since both 802.11b and 802.11g may occupy the same frequency band, i.e. 2.4 GHz, to transmit data, it is important for a wireless communication receiver to identify the WLAN standard when receiving data so that it can be demodulated in an appropriate way.

Many wireless communication systems of the prior art include two packet detection circuits to respectively detect the two different WLAN standards. The packet detection circuits are configured to receive the preamble of data to determine the WLAN standard.

Figure 1:
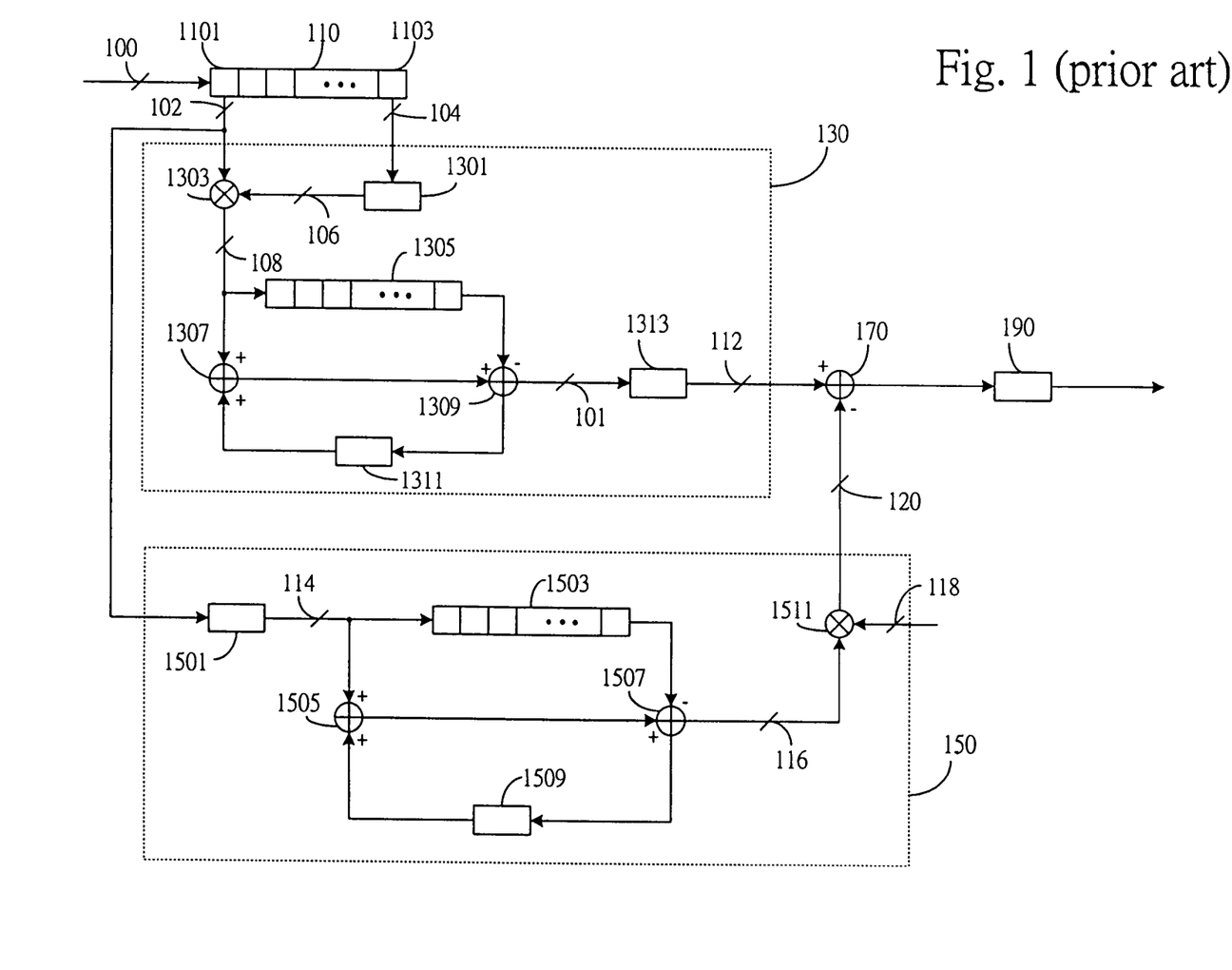
FIG. 1 illustrates a packet detection circuit of the prior art.

FIG. 1 shows a packet detection circuit of the prior art, which is adapted to, for example, detect whether a received data is under 802.11b standard. The packet detection circuit includes a shift register 110, a delay-correlator 130, an auto-correlator 150, an adder 170 and logic 190. The shift register 110 is configured to receive the preamble 100 of the data. Because the packet detection circuit is adapted to detect the 802.11b standard, the shift register 110 is required to store successive 40+1 taps, each of which is at 40 MHz, so that a first storage unit 1101 and a last storage unit 1103 can respectively store two corresponding taps 102, 104 in two adjacent periods. For example, if the tap 102 is the first tap of the fifth short period, then the tap 104 is the first tap of the fourth short period. The delay-correlator 130 is configured to perform delay-correlation to obtain a data moving average of the preamble 100. The auto-correlator 150 is configured to perform auto-correlation to obtain a normalized power moving average of the preamble 100. The adder 170 is configured to compare the normalized power moving average with the data moving average. The logic 190 is configured to determine the result of the comparison. Based on the determination, the wireless communication systems of the prior art are able to identify if the received data is under 802.11b standard or not.

To obtain the data moving average of the preamble 100, the delay-correlator 130 includes seven elements 1301, 1303, ..., 1313. A first element 1301 executes a complement calculation of the tap 104 and outputs a complement result 106. A second element 1303 multiplies the tap 102 to the complement result 106 and outputs a signal 108 indicating whether the taps 102 and 104 correspond to each other. The correspondence herein means that the sequence of the tap 102 in one period is identical to that of the tap 104 in the immediate preceding period. If yes, the signal 108 asserts HIGH. It happens only when the data is modulated under the 802.11b standard because the number of the storage units of the shift register 110 is particularly decided based on the number of taps in a period under the 802.11b standard. A third element 1305 is another shift register used to store some successive signals 108 in order. The number of the storage units of the element 1305 depends on practical needs. A fourth element 1307 and a fifth element 1309 are respectively an adder. A sixth element 1311 delays the output signal of the fifth element 1309. The elements 1305, 1307, 1309 and 1311 are used to obtain the data moving average 101 of the preamble 100. A seventh element 1313 calculates and outputs an absolute value 112 of the data moving average 101.

To obtain a normalized power moving average of the preamble 100, the auto-correlator 150 includes six elements 1501, 1503, ..., 1511. A first element 1501 calculates a power value of the tap 102 and outputs a signal 114 indicative of the power value. A second element 1503, a third element 1505, a fourth element 1507 and a fifth element 1509 are used to obtain the power moving average 116 of the preamble 100. Their functions and structures are respectively identical to the third element 1305, the fourth element 1307, the fifth element 1309 and the sixth element 1311 of the delay-correlator 130. A sixth element 1511 is a multiplier configured to normalize the power moving average 116 based on a predetermined factor 118 and to output a signal 120 indicative of the normalized power moving average of the preamble 100.

The wireless communication systems of the prior art need another packet detection circuit as FIG. 1 shows to detect whether the data is modulated under the 802.11g standard. The difference between the two packet detection circuits is the number of the storage units of the shift register 110. The number of the storage units of the shift register 110 for 802.11g/OFDM signals is (32+1) taps instead of (40+1) taps because each period of the preamble of the data modulated under 802.11g/OFDM includes 32 taps.

The drawback of the prior art is the requirement of two packet detection circuits. One can realize that if a wireless communication system is required to identify three different WLAN standards, it needs three packet detection circuits. This increases cost and occupies much IC layout area.

SUMMARY OF THE INVENTION

The present invention provides a wireless communication receiver to receive a packet selectively in form of a WLAN standard among N WLAN standards, wherein N is an integer larger than 1. The packet includes a preamble with several periods and a modulated data. The WLAN standard of the packet can be determined by analyzing the periods.

The wireless communication receiver includes a device for identifying the WLAN standard of the packet and a demodulator for demodulating the modulated data. The device is a single circuit having a shift register, a determinator and decision logic. The shift register is configured to receive the periods of the preamble. The determinator is configured to determine whether the WLAN standard of the packet matches one of the N WLAN standards according to the periods and to output N first signals indicative of N results. Decision logic is configured to decide the WLAN standard of the packet according to the N first signals and to output a second signal indicative of a decision result. The demodulator demodulates the modulated data according to the second signal.

The wireless communication receiver can be used particularly to determine 802.11b and 802.11g/OFDM signals, i.e., N is equal to 2. The determinator is configured to determine whether the WLAN standard of the packet matches IEEE 802.11b or whether the WLAN standard of the packet matches IEEE 802.11g/OFDM.

According to the aforementioned receiver, the present invention further provides a method to obtain a demodulated data from a packet selectively in form of a WLAN standard. The method includes the steps of receiving the periods of the preamble; identifying, by a single circuit, the WLAN standard of the packet among N WLAN standards according to the periods of the preamble and generating an identification signal indicative of a result; receiving the modulated data; and demodulating the modulated data according to the identification signal.

The present invention also provides a circuit to identify a modulation type of a packet among N modulation types. The circuit includes a shift register, a determinator and decision logic. The shift register is configured to receive periods of the preamble of the packet. The determinator is configured to determine whether the modulation type of the packet matches one of the N modulation types according to the periods and to output N signals indicative of N results. The decision logic is configured to decide the modulation type of the packet according to the N signals outputted by the determinator.

According to the aforementioned circuit, the present invention further provides a method to identify a modulation type of the packet. The method includes the steps of receiving periods of the preamble; determining the modulation type of the packet by one single circuit which includes a determinator; and deciding the modulation type of the packet according to N signals generated by the determinator.

DETAILED DESCRIPTION

Figure 2:
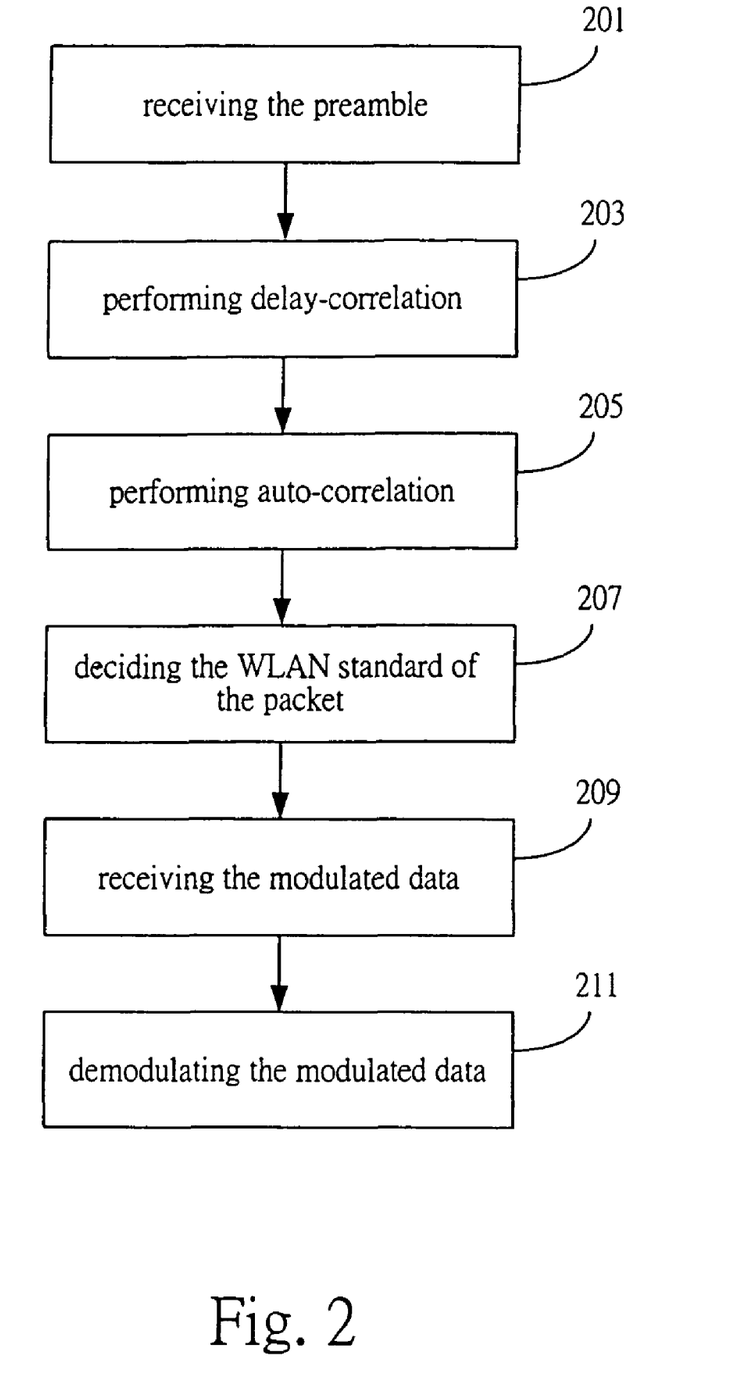
FIG. 2 is a flow chart showing the steps of obtaining a demodulated data from a packet.

FIG. 2 shows the method of the present invention for outputting a demodulated data responsive to a packet selectively in form of a WLAN standard among N WLAN standards, wherein N is an integer larger than 1. In step 201, the preamble is received. After the preamble is received, a single circuit is provided to identify the WLAN standard of the packet among N WLAN standards according to the preamble and to generate an identification signal indicative of a result. To execute the identification, the single circuit respectively outputs N determination signals by determining whether the WLAN standard of the packet matches one of the N WLAN standards. To execute the determination, as step 203 shows, the single circuit performs delay-correlation of the preamble, and, as step 205 shows, the single circuit performs auto-correlation of the preamble. In step 207, the single circuit decides the WLAN standard of the packet according to the N determination signals and outputs the identification signal. In step 209, the modulated data is received. In step 211, the modulated data is demodulated according to the identification signal.

Figure 3:
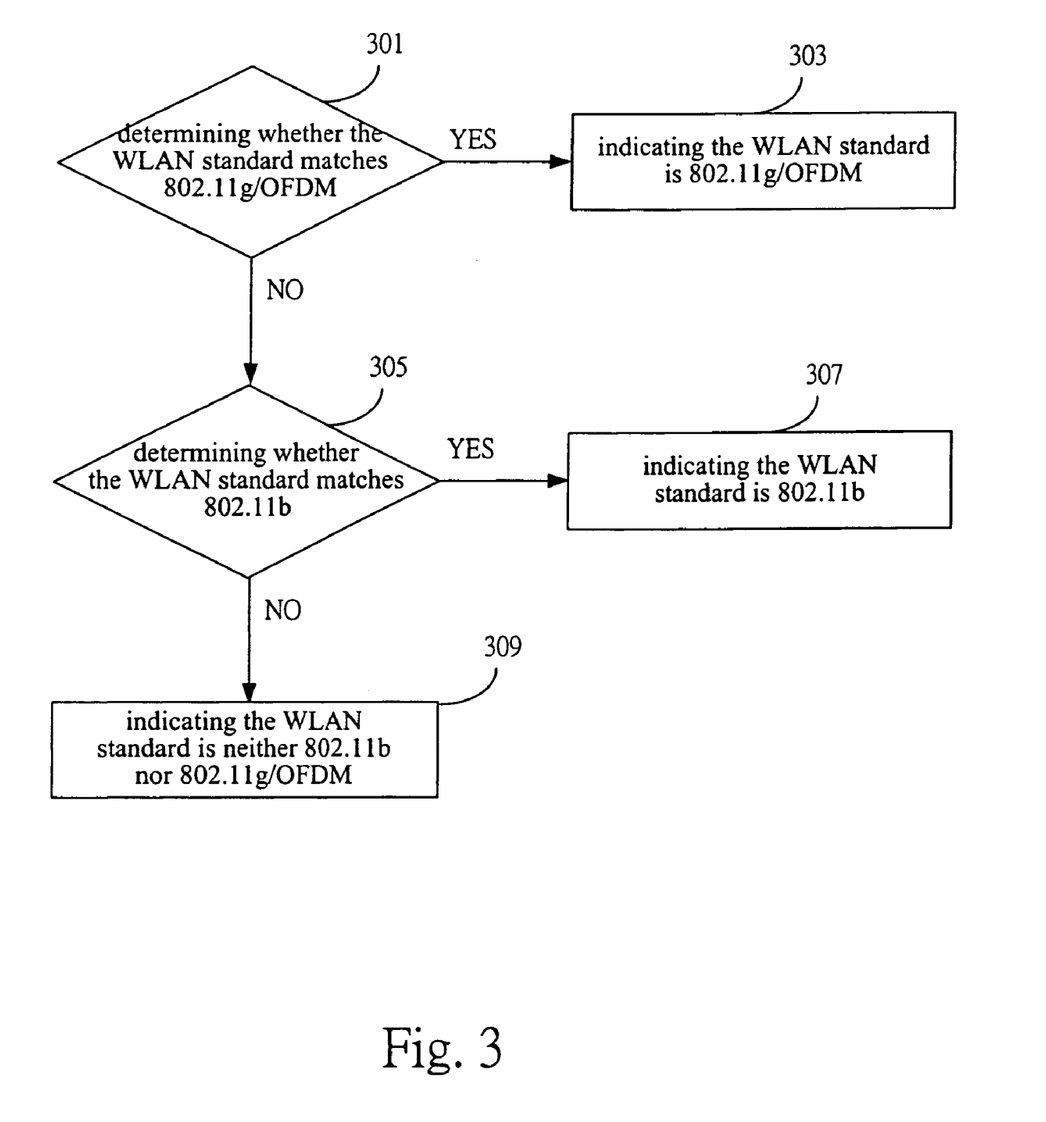
FIG. 3 is a flow chart showing the decision step shown in FIG. 2.

If the single circuit is configured to determine whether the WLAN standard of the packet matches IEEE 802.11b or 802.11g/OFDM, step 207 further includes the steps shown in FIG. 3. In step 301, the single circuit determines whether the WLAN standard of the packet matches 802.11g/OFDM. If yes, step 303 is executed and the single circuit outputs a signal to indicate that the WLAN standard of the packet is 802.11g/OFDM. If not, step 305 is executed and the single circuit determines whether the WLAN standard of the packet matches 802.11b. If yes, step 307 is executed and the single circuit outputs a signal to indicate that the WLAN standard of the packet is 802.11b. If not, it means that the WLAN standard of the packet is neither 802.11b nor 802.11g/OFDM. Step 309 is then executed and the single circuit outputs a signal to indicate this situation.

Figure 4:
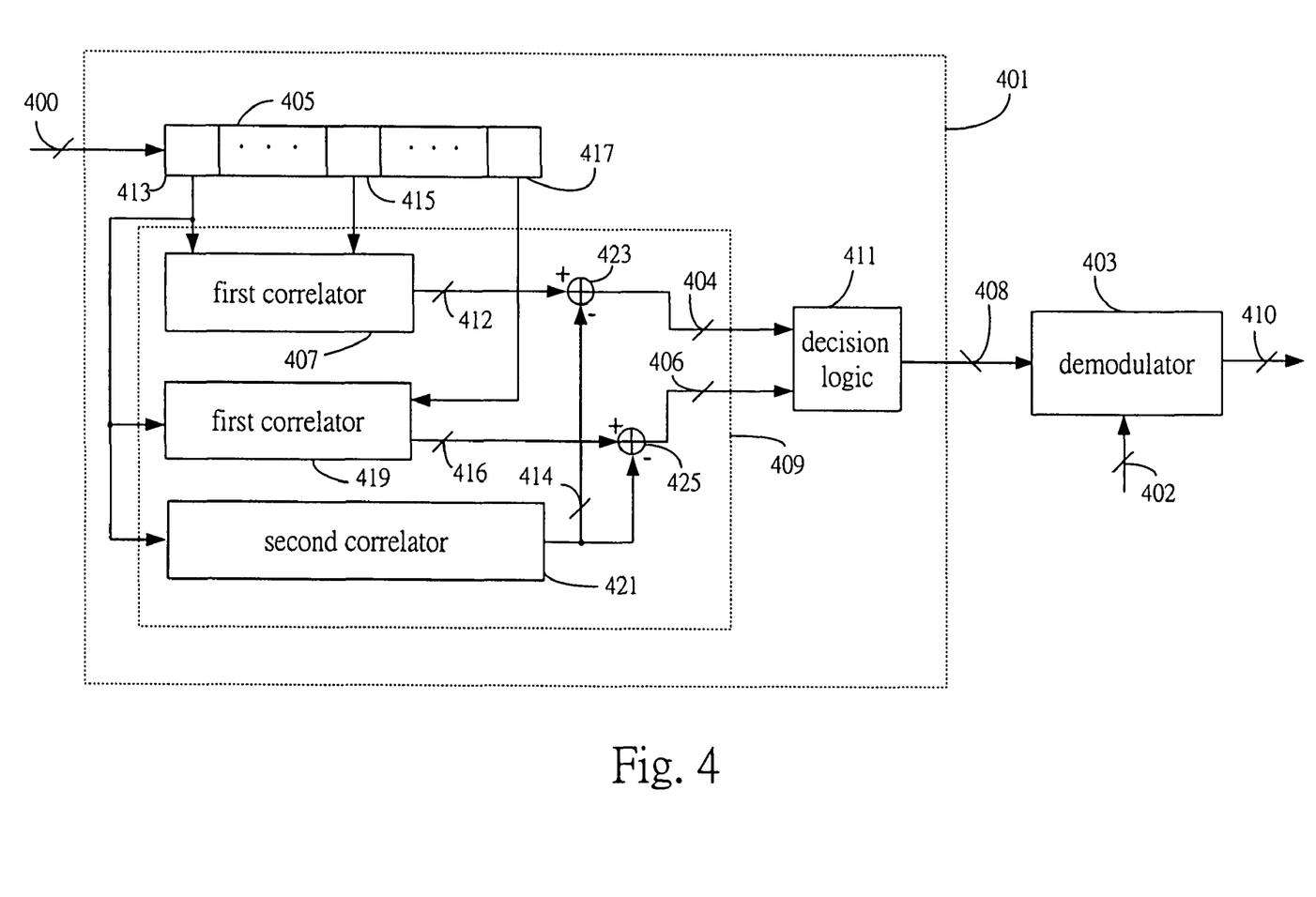
FIG. 4 illustrates a circuitry of the wireless communication receiver in accordance to the present invention.

FIG. 4 shows an embodiment of the wireless communication receiver adapted to perform the steps in FIGS. 2 and 3. The embodiment is particularly used to identify whether the WLAN standard of a packet matches 802.11b or 802.11g/OFDM. The packet has a preamble 400 with 10 short periods and a modulated data 402. The wireless communication receiver includes a circuit 401 for identifying the WLAN standard of the packet and a demodulator 403 for demodulating the modulated data 402. The circuit 401 includes a shift register 405, a determinator 409 and decision logic 411. The shift register 405 is configured to receive the short periods of the preamble 400. Due to different period lengths between the preambles of 802.11b and 802.11g/OFDM signals, the shift register 405 has three output units 413, 415, 417. The output unit 413 is the $1^{st}$ unit used to output the $1^{st}$ tap stored in the shift register 405. The output unit 415 is the $33^{rd}$ unit used to output the $33^{rd}$ tap stored in the shift register 405. The output unit 417 is the $41^{st}$ unit used to output the $41^{st}$ tap stored in the shift register 405. The determinator 409 includes two first correlators 407, 419 and a second correlator 421. The first correlator 407, as well as the second correlator 421, is configured to determine whether the WLAN standard of the packet matches 802.11g/OFDM by retrieving the $1^{st}$ tap and the $33^{rd}$ tap, and to output a first signal 404 indicative of a result. The first correlator 419, as well as the second correlator 421, is configured to determine whether the WLAN standard of the packet matches 802.11b by retrieving the $1^{st}$ tap and the $41^{st}$ tap, and to output a first signal 406 indicative of a result. The decision logic 411 is configured to decide the WLAN standard of the packet according to the two first signals 404, 406 and to output a second signal 408 indicative of a decision result. The demodulator 403 then generates a demodulated data 410 according to the second signal 408.

The first correlators 407, 419 are configured to perform delay-correlation of the preamble 400 to obtain a data moving average 412 respectively. The detailed function and circuitry of the first correlators 407, 419 may be identical to the function and circuitry of the delay-correlator 130 shown in FIG. 1. The second correlator 421 is configured to perform auto-correlation of the preamble 400 to obtain a normalized power moving average 414. The detailed function and circuitry of the second correlator 421 may be identical to the function and circuitry of the auto-correlator 150 shown in FIG. 1. The determinator 409 further includes two adders 423, 425. The adder 423 is configured to compare the normalized power moving average 414 with the data moving average 412 and then to generate the first signal 404. The adder 425 is configured to compare the normalized power moving average 414 with the data moving average 416 and then to generate the first signal 406. Therefore, the first signal 404 indicates whether the packet is modulated under 802.11g/OFDM standard, and the first signal 406 indicates whether the packet is modulated under 802.11b standard.

The decision logic 411 may be, but is not limited to be, implemented by an OR gate which receives the two first signals 404, 406. Alternatively, the decision logic 411 may include logic to execute the determination steps shown in FIG. 3. The decision logic 411 includes logic to determine whether the WLAN standard of the packet matches 802.11g/OFDM according to the first signal 404. If yes, the decision logic 411 outputs the second signal 408 to indicate that the WLAN standard of the packet is 802.11g/OFDM. If not, the decision logic 411 further includes logic to determine whether the WLAN standard of the packet matches 802.11b according to the first signal 406. If yes, the decision logic 411 outputs the second signal 408 to indicate that the WLAN standard of the packet is 802.11b. If not, it means that the WLAN standard of the packet is neither 802.11b or 802.11g/OFDM. The decision logic 411 outputs the second signal 408 to indicate this situation. The demodulator 403, therefore, does not demodulate the modulated data 402.

Based on the above descriptions, one can realize that the method for identifying the WLAN standard of the packet relies on that different WLAN standards have different period lengths. Accordingly, the present invention can be applied to any communication device needing to identify the modulation type of data among N modulation types as long as each of the modulation types has a unique period length different from one another.

Figure 5:
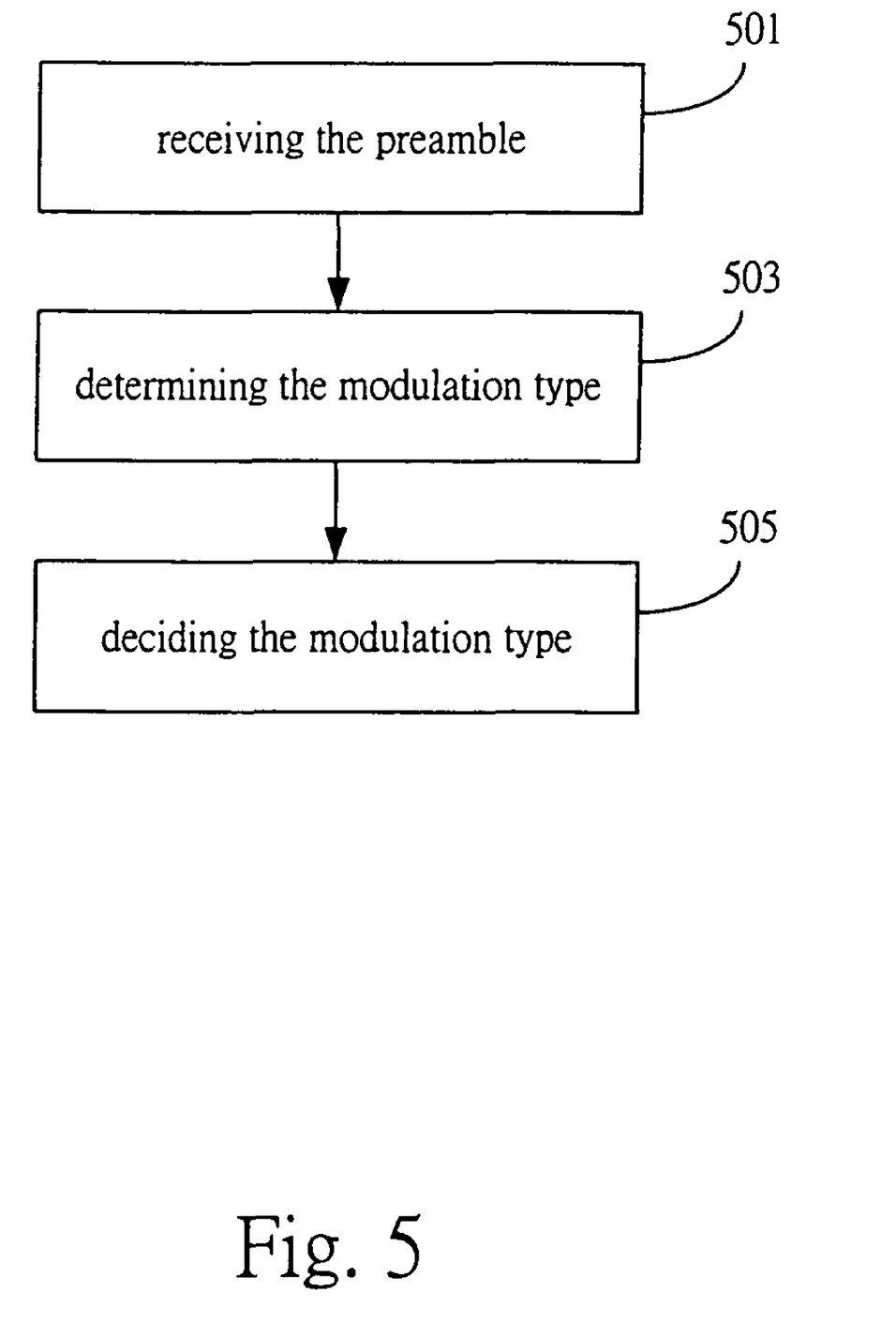
FIG. 5 is a flow chart showing the steps of identifying the modulation type of a packet.

FIG. 5 shows the method of the present invention for identifying the modulation type of a packet among N modulation types. In step 501, the preamble is received. In step 503, a single circuit is provided to determine the modulation type of the packet. More specifically, the single circuit includes a determinator. The determinator is configured to determine whether the modulation type of the packet matches one of the N modulation types according to the preamble and to output N signals indicative of N results. In step 505, the single circuit decides the modulation type of the packet according to the N signals generated by the determinator.

Figure 6:
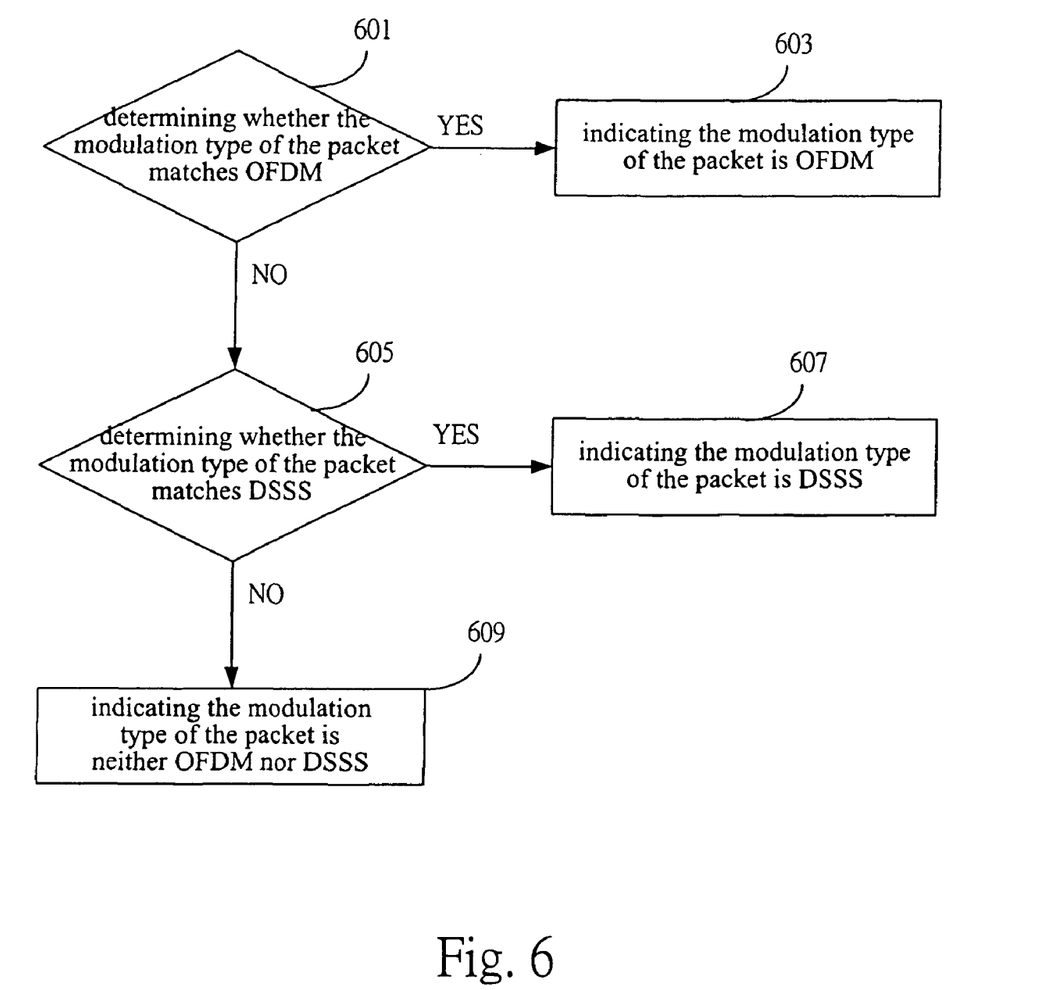
FIG. 6 is a flow chart showing the decision step shown in FIG. 5.

If the single circuit is configured to determine whether the modulation type of the packet matches DSSS or OFDM, step 505 further includes the steps shown in FIG. 6. In step 601, the single circuit determines whether the modulation type of the packet matches OFDM. If yes, step 603 is executed and the single circuit outputs a signal to indicate that the modulation type of the packet is OFDM. If not, step 605 is executed and the circuit determines whether the modulation type of the packet matches DSSS. If yes, step 607 is executed and the single circuit outputs a signal to indicate that the modulation type of the packet is DSSS. If not, step 609 is executed to indicate that the modulation type of the packet is neither OFDM or DSSS.

The circuitry of the single circuit for determining whether the modulation type of the packet matches DSSS or OFDM is identical to the circuit 401 shown in FIG. 4. The shift register 405 is configured to receive the periods of the preamble 400. The first correlator 407 and the second correlator 421 are configured to determine whether the modulation type of the packet matches OFDM since the first correlator 407 retrieves the $1^{st}$ tap and the $33^{rd}$ tap from the shift register 405 and to output the first signal 404 indicative of a result. The first correlator 419 and the second correlator 421 are configured to determine whether the modulation type of the packet matches DSSS since the first correlator 419 retrieves the $1^{st}$ tap and the $41^{st}$ tap from the shift register 405 and to output the first signal 406 indicative of a result. Both first correlators 407, 419 perform delay-correlation and the second correlator 421 to perform auto-correlation. The decision logic 411 is configured to decide the modulation type of the packet according to the first signals 404, 406.

The decision logic 411 may include logic to execute the determination steps shown in FIG. 6. The decision logic 411 includes logic to determine whether the modulation type of the packet matches OFDM according to the first signal 404. If yes, the decision logic 411 outputs the second signal 408 to indicate that the modulation type of the packet is OFDM. If not, the decision logic 411 further includes logic to determine whether the modulation type of the packet matches DSSS according to the first signal 406. If yes, the decision logic 411 outputs the second signal 408 to indicate that the modulation type of the packet is DSSS. If not, it means that the modulation type of the packet is neither OFDM nor DSSS.

The present invention uses a single circuit to identify the WLAN standard of a packet or the modulation type of a packet. The single circuit includes a determinator having several first correlators and a shared second correlator. This characteristic can reduce redundant circuitry of packet detection and, hence, reduce cost and IC layout area.

The above description is expected to clearly expound the characteristics of the present invention but not expected to restrict the scope of the present invention. Those skilled in the art will readily observe that numerous modifications and alterations may be made while retaining the teaching of the invention. Accordingly, the above disclosure should be construed as limited only by the bounds of the claims.

The invention claimed is:

1. A wireless communication receiver for receiving a packet selectively in form of a WLAN standard among N WLAN standards, N being an integer larger than 1, the packet comprising a preamble and a modulated data, the wireless communication receiver comprising:
   a circuit for identifying the WLAN standard of the packet, comprising:
      a shift register for receiving the preamble, said shift register comprising a common output unit for outputting a common preamble period stored in the shift register and N output units for outputting N different preamble periods stored in the shift register corresponding to N WLAN standards;
      a determinator comprising N first correlators and one second correlator, the N first correlators and the second correlator connected to the common output unit for retrieving the common preamble period, the N first correlators connected to the N output units respectively for retrieving the N different preamble periods respectively, wherein outputs of the N first correlators are each compared with an output of the second correlator respectively to output N first signals; and
      decision logic for deciding the WLAN standard of the packet according to the N first signals and outputting a second signal indicative of a decision result; and
   a demodulator for demodulating the modulated data according to the second signal.

2. The wireless communication receiver of claim 1, wherein N is equal to 2, and the determinator is configured to determine whether the WLAN standard of the packet matches IEEE 802.11b or matches IEEE 802.11g/OFDM.

3. The wireless communication receiver of claim 1, wherein the N first correlators are for performing delay-correlation of the preamble respectively according to different preamble periods of the shift register; and
   the second correlator is for performing auto-correlation of the preamble.

4. The wireless communication receiver of claim 2, wherein the decision logic comprises:
   logic for determining if one of the first signals indicative that whether the WLAN standard of the packet matches 802.11g/OFDM is TRUE, and if yes, the second signal indicating the WLAN standard of the packet is 802.11g/OFDM; and
   logic for determining if the other of the first signals indicative that whether the WLAN standard of the packet matches 802.11b is TRUE as result of step (a) is FALSE, and if result of step (b) is yes, the second signal indicating the WLAN standard of the packet is 802.11b.

5. A wireless communication device for identifying a WLAN standard of a packet among N WLAN standards, N being an integer larger than 1, the packet comprising a preamble, the device comprising:
   a shift register for receiving the preamble, said shift register comprising a common output unit for outputting a common preamble period stored in the shift register and N output units for outputting N different preamble periods stored in the shift register corresponding to N WLAN standards;
   a determinator comprising N first correlators and one second correlator, the N first correlators and the second correlator connected to the common output unit for retrieving the common preamble period, the N first correlators connected to the N output units respectively for retrieving the N different preamble periods respectively, wherein outputs of the N first correlators are each compared with an output of the second correlator respectively to output N signals; and
   decision logic for deciding the WLAN standard of the packet according to the N signals.

6. The wireless communication device of claim 5, wherein N is equal to 2, and the determinator is configured to determine whether the WLAN standard of the packet matches IEEE 802.11b or matches IEEE 802.11g/OFDM.

7. The wireless communication device of claim 5, wherein the N first correlators are for performing delay-correlation of the preamble respectively according to different preamble periods of the shift register; and
   the second correlator is for performing auto-correlation of the preamble.

8. The wireless communication device of claim 6, wherein the decision logic comprises:
   logic for determining if one of the signals indicative that whether the WLAN standard of the packet matches 802.11g/OFDM is TRUE, and if yes, the decision logic deciding the WLAN standard of the packet is 802.11g/OFDM; and
   logic for determining if the other of the signals indicative that whether the WLAN standard of the packet matches 802.11b is TRUE as result of step (a) is FALSE, and if result of step (b) is yes, the decision logic deciding the WLAN standard of the packet is 802.11b.

9. A circuit for identifying a modulation type of a packet among N modulation types, N being an integer larger than 1, the packet comprising a preamble, the circuit comprising:
   a shift register for receiving the preamble, said shift register comprising a common output unit for outputting a common preamble period stored in the shift register and N output units for outputting N different preamble periods stored in the shift register corresponding to N modulation types;
   a determinator comprising N first correlators and one second correlator, the N first correlators and the second correlator connected to the common output unit for retrieving the common preamble period, the N first correlators connected to the N output units respectively for retrieving the N different preamble periods respectively, wherein outputs of the N first correlators are each compared with an output of the second correlator respectively to output N signals; and
   decision logic for deciding the modulation type of the packet according to the N signals.

10. The circuit of claim 9, wherein N is equal to 2, and the determinator is configured to determine whether the modulation type of the packet matches direct sequence spread spectrum (DSSS) or matches orthogonal frequency division multiplexing (OFDM).

11. The circuit of claim 9, wherein the
    N first correlators are for performing delay-correlation of the preamble respectively according to different preamble periods of the shift register; and
    the second correlator is for performing auto-correlation of the preamble.

12. The circuit of claim 10, wherein the determination of the modulation type of the packet comprises the steps of:
    determining if one of the signals indicative that whether the modulation type of the packet matches OFDM is TRUE, and if yes, the decision logic deciding the modulation type of the packet is OFDM; and
    determining if the other of the signals indicative that whether the modulation type of the packet matches DSSS is TRUE as result of step (a) is FALSE, and if result of the step (b) is yes, the decision logic deciding the modulation type of the packet is DSSS.

13. A method for outputting a demodulated data responsive to a packet selectively in form of a WLAN standard among N WLAN standards, N being an integer larger than 1, the packet comprising a preamble and a modulated data, the method comprising:
    receiving the preamble by one shift register, said shift register comprising a common output unit for outputting a common preamble period stored in the shift register and N output units for outputting N different preamble periods stored in the shift register corresponding to N WLAN standards;
    identifying, by a single circuit, the WLAN standard of the packet among N WLAN standards according to the preamble and generating an identification signal indicative of a result;
    receiving the modulated data; and
    demodulating the modulated data according to the identification signal;
    wherein the identification step comprises the steps of:
    (e) retrieving the common preamble period by connecting N first correlators and a second correlator to the common output unit;
    (f) respectively retrieving the N different preamble periods by connecting the N first correlators to the N output units;
    (g) respectively outputting N determination signals by comparing an output of each of the N first correlators with an output of the second correlator; and
    (h) deciding the WLAN standard of the packet according to the N determination signals and outputting the identification signal.

14. The method of claim 13, wherein N is equal to 2, and the determination step determines whether the WLAN standard of the packet matches one of IEEE 802.11b and 802.11g/OFDM.

15. The method of claim 14, wherein the determination step further comprises the steps of:

the N first correlators performing delay-correlation of the preamble according to different preamble periods of the shift register respectively; and the second correlator performing auto-correlation of the preamble.

16. The method of claim 14, wherein the decision step further comprises the steps of:

determining if one of the determination signals corresponding to 802.11g/OFDM is TRUE, and if yes, the result indicating the WLAN standard of the packet is 802.11g/OFDM; and determining if the other of the determination signals corresponding to 802.11b is TRUE as result of step (i) is FALSE, and if result of step (j) is yes, the result indicating the WLAN standard of the packet is 802.11b.

17. A method for identifying a WLAN standard of a packet among N WLAN standards, N being an integer larger than 1, the packet comprising a preamble, the method comprising:

receiving the preamble by one shift register, said shift register comprising a common output unit for outputting a common preamble period stored in the shift register and N output units for outputting N different preamble periods stored in the shift register corresponding to N WLAN standards;

determining, by a single circuit, whether the WLAN standard of the packet matches one of the N WLAN standards according to N first correlators and one second correlator, the N first correlators and the second correlator connected to the common output unit for retrieving the common preamble period, the N first correlators connected to the N output units respectively for retrieving the N different preamble periods respectively, and outputting N signals indicative of N results by comparing an output of each of the N first correlators with an output of the second correlator; and deciding the WLAN standard of the packet according to the N signals.

18. The method of claim 17, wherein N is equal to 2 and the N WLAN standards are IEEE 802.11b and 802.11g/OFDM.

19. The method of claim 18, wherein the determination of the WLAN standard of the packet comprises the steps of:

(d) the N first correlators performing delay-correlation of the preamble according to different preamble periods of the shift register respectively; and (e) the second correlator performing auto-correlation of the preamble.

20. The method of claim 18, wherein the decision step further comprises the steps of:

(f) determining if one of the signals corresponding to 802.11g/OFDM is TRUE, and if yes, the WLAN standard of the packet being decided to be 802.11g/OFDM; and (g) determining if the other of the signals corresponding to 802.11b is TRUE as result of step (f) is FALSE, and if result of step (g) is yes, the WLAN standard of the packet being decided to be 802.11b.

21. A method for identifying a modulation type of a packet among N modulation types, N being an integer larger than 1, the packet comprising a preamble, the method comprising:

receiving the preamble by one shift register, said shift register comprising a common output unit for outputting a common preamble period stored in the shift register and N output units for outputting N different preamble periods stored in the shift register corresponding to N modulation types;

determining the modulation type of the packet by one single circuit comprising N first correlators and one second correlator, the N first correlators and the second correlator connected to the common output unit for retrieving the common preamble period, the N first correlators connected to the N output units respectively for retrieving the N different preamble periods respectively, wherein an output of each of the N first correlators is compared with an output of the second correlator respectively to output N signals; and deciding the modulation type of the packet according to the N signals.

22. The method of claim 21, wherein N is equal to 2, and the determinator is configured to determine whether the modulation type of the packet matches DSSS or matches OFDM.

23. The method of claim 21, wherein the

N first correlators are for performing delay-correlation of the preamble according to different preamble periods of the shift register; and the second correlator is for performing auto-correlation of the preamble.

24. The method of claim 22, wherein the decision step further comprises the steps of:

(d) determining if one of the signals corresponding to OFDM is TRUE, and if yes, the modulation type of the packet being decided to be OFDM; and (e) determining if the signal corresponding to DSSS is TRUE as result of step (d) is FALSE, and if result of step (e) is yes, the modulation type of the packet being decided to be DSSS.

* * * * *